United States Patent [19]

Kurihara et al.

[11] Patent Number: 5,005,687
[45] Date of Patent: Apr. 9, 1991

[54] CONTROL SYSTEM FOR AUTOMATIC TRANSMISSION APPARATUS FOR VEHICLES

[75] Inventors: Kazumasa Kurihara; Tsutomu Takahashi, both of Higashimatsuyama, Japan

[73] Assignee: Diesel Kiki Co., Ltd., Tokyo, Japan

[21] Appl. No.: 449,190

[22] Filed: Dec. 13, 1989

[30] Foreign Application Priority Data

Dec. 15, 1988 [JP] Japan .................. 63-314976

[51] Int. Cl.$^5$ ............................. B60K 41/28
[52] U.S. Cl. ................. 192/0.073; 192/0.092; 74/856; 180/133; 364/424.1
[58] Field of Search ............... 192/0.052, 0.073, 0.076, 192/0.092, 3.55, 3.58; 364/424.1; 180/133; 74/856

[56] References Cited

U.S. PATENT DOCUMENTS 3,800,900 4/1974 Goodale ................. 180/133
4,848,529 7/1989 Kurihara et al. ............. 192/0.076

FOREIGN PATENT DOCUMENTS 60-91050 5/1985 Japan ................... 74/856

*Primary Examiner*—Richard Lorence
*Attorney, Agent, or Firm*—Pollock, Vande Sande & Priddy

[57] ABSTRACT

In an automatic transmission system for a vehicle having a gear transmission and a clutch which are electronically controlled by a control unit, the system includes a discrimination unit for discriminating whether or not the vehicle is running with the gear transmission shifted to its neutral position and a determining unit for determining a target gear position to which the gear transmission is to be shifted in the case where the vehicle is running without fuel-combustion in the engine. The control unit is caused to control the gear transmission to shift to the target gear position and the clutch to engage in response to the discrimination unit when an ignition switch is turned to its OFF position in the case where the vehicle is running with the gear transmission shifted to the neutral position, whereby the rotational torque of wheels can be transmitted through the automatic transmission system to the engine. As a result, the rotating of the engine is assured even if the ignition switch is turned to its OFF position to stop the fuel combustion in the engine.

11 Claims, 5 Drawing Sheets

CONTROL SYSTEM FOR AUTOMATIC TRANSMISSION APPARATUS FOR VEHICLES

BACKGROUND OF THE INVENTION

The present invention relates to a system for controlling an automatic vehicle transmission apparatus including a gear transmission and a clutch, both of which are electronically controlled.

In the prior art an automatic transmission system for vehicles including a gear transmission and a clutch which are electronically controlled by an electronic control unit is well known. In the conventional automatic transmission system of such type, when the ignition switch is turned to its OFF position, the power supply for the electronic control unit is maintained even after fuel combustion in the engine has stopped whereas operations for the gear transmission and the clutch are ceased.

Accordingly, the following disadvantages will occur when a power steering system and/or a power braking system powered by the associated internal combustion engine is employed in the vehicle.

If the gear transmission is shifted to its neutral position or the clutch is in a disconnected condition at the time the ignition switch is turned to the OFF position to stop the fuel combustion in the engine, since the rotational torque of the axle caused by vehicle running cannot be transmitted to the output shaft of engine, the rotational speed of the engine immediately becomes zero. This immediately makes the power steering system and the power braking system inoperable because the engine rotation stops even though the vehicle continues to run. As a result, it is difficult to maintain the power steering system and the power braking system in an adequately safe operating condition until the vehicle stops. This is a dangerous state of vehicle operation.

SUMMARY OF THE INVENTION

It is an object of the present invention to provide an improved system for controlling an automatic vehicle transmission apparatus.

It is another object of the present invention to provide a control system for an automatic transmission apparatus suitable for vehicles with a power steering system powered by the associated engine or the like.

It is a further object of the present invention to provide a control system for an automatic transmission apparatus for vehicles, which enables the vehicle to operate safely until the vehicle stops.

According to the present invention, in a system for controlling a vehicle transmission apparatus for a vehicle powered by an internal combustion engine including a gear transmission electronically controlled by a transmission control device and a clutch electronically controlled by a clutch control device, the system comprises means coupled with an ignition switch for producing a key-switch signal indicating that the ignition switch is in its OFF position, a discriminating means responsive to the key-switch signal for discriminating whether or not the vehicle is running with the gear transmission shifted to its neutral position and fuel combustion in the engine discontinued, a first means for determining a first target gear position to which the gear transmission is to be shifted when the vehicle is running with the engine powered by the fuel combustion, a second means for determining a second target gear position to which the gear transmission is to be shifted in the case where the vehicle is running without fuel-combustion in the engine, a providing means for providing one of the outputs of the first or second means to the transmission control device in accordance with the discrimination result of the discriminating means, whereby the transmission control device is caused to control the gear transmission to shift to the gear position indicated by the provided output, and means responsive to the discriminating means for producing a control signal for controlling the clutch control device to engage the clutch at a prescribed timing.

DESCRIPTION OF THE PREFERRED EMBODIMENT

Figure 1A:
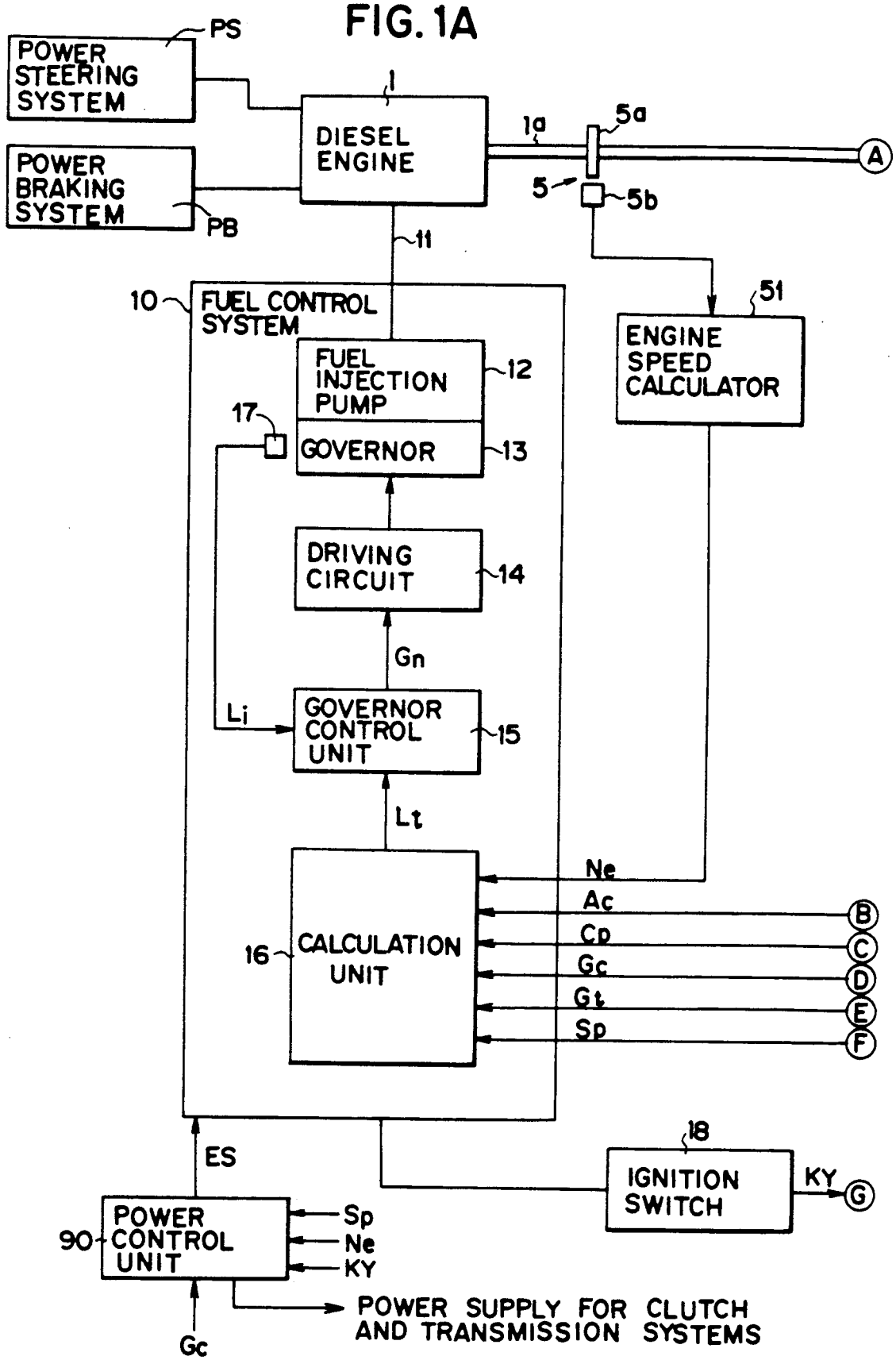
FIGS. 1A and 1B are block diagrams showing an embodiment of a vehicle control system including an automatic transmission control system according to the present invention.
Figure 1B:
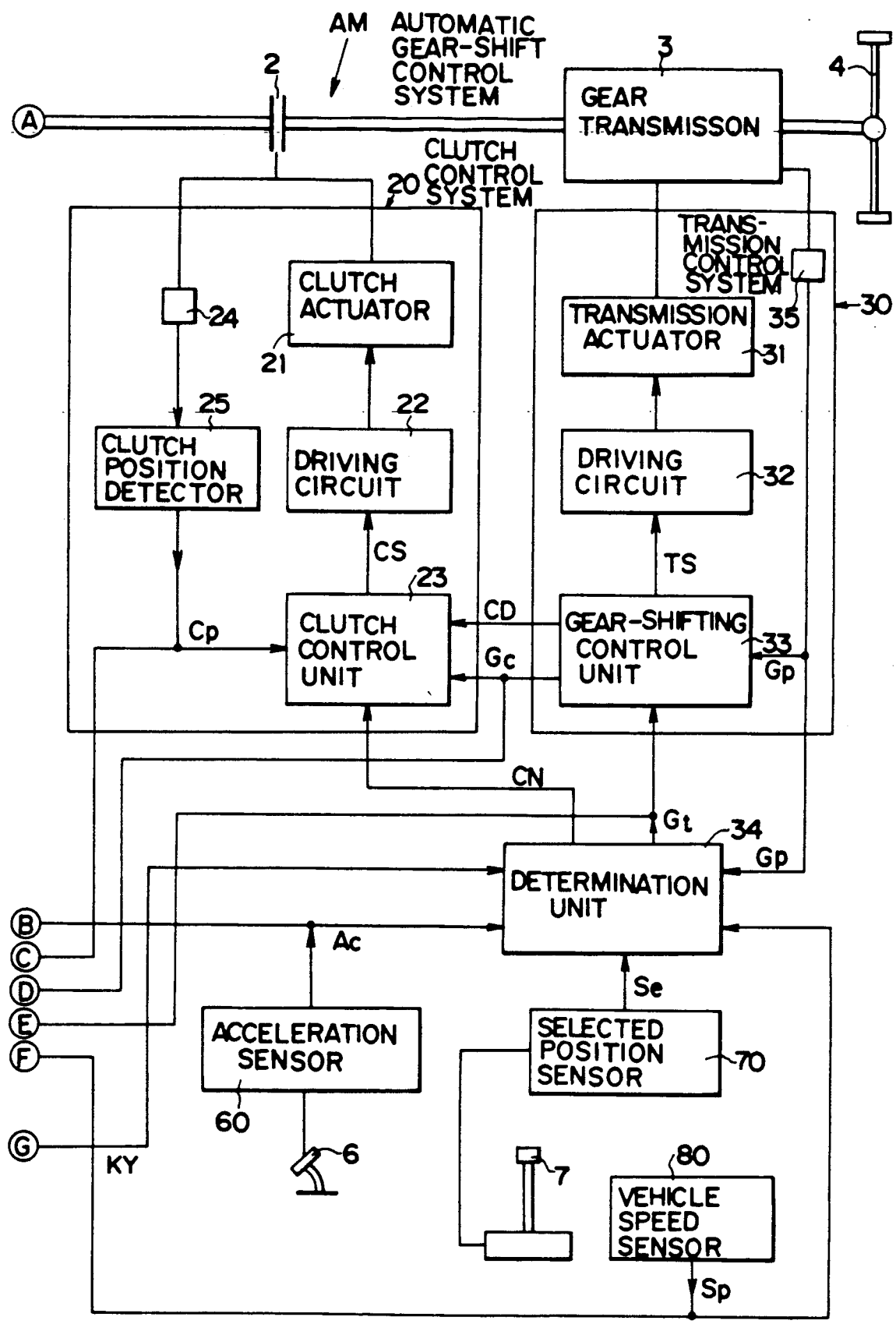

Referring to FIGS. 1A and 1B, a diesel engine 1 has an output shaft 1a which is coupled through a clutch 2 and a gear transmission 3 with an axle 4, and receives fuel from a fuel control system 10. The clutch 2 is associated with a clutch control system 20 to be electronically controlled and the gear transmission 3 is associated with a transmission control system 30 to be electronically controlled, by which an automatic gear-shift control system AM is formed for electronically operating the clutch 2 and the gear transmission 3 to perform an automatic gear-shifting operation.

An engine speed detector 5 composed of a pulser 5a secured on the output shaft 1a and an electromagnetic pick-up coil sensor 5b is provided between the diesel engine 1 and the clutch 2, and the output signal from the electromagnetic pick-up coil sensor 5b is applied to an engine speed calculator 51 for producing an engine speed signal Ne indicative of the rotational speed of the diesel engine 1.

Reference numeral 60 designates an acceleration sensor coupled with an accelerator pedal 6 to produce an acceleration signal Ac showing the amount of operation of the accelerator pedal 6, and 70 designates a selected position sensor 70 coupled with a selector 7 to produce a selector signal Se showing the position selected by the selector 7. A vehicle speed sensor 80 produces a vehicle speed signal Sp showing the running speed of the vehicle (not shown) powered by the diesel engine 1. The vehicle powered by the diesel engine 1 is provided with a power steering system PS and a power braking system PB both of which are coupled with the diesel engine 1 and are driven by the use of the rotational torque produced from the diesel engine 1. Since both the power steering system PS and the power braking system PB are conventional systems, no detail description of these systems will be given here.

The fuel control system 10 comprises a fuel injection pump 12 from which fuel is supplied through a fuel pipe 11 to the diesel engine 1. A governor 13 is mounted on the fuel injection pump 12 so as to be coupled with a control rack (not shown) of the fuel injection pump 12. A governor control unit 15 receives an actual position signal Li showing the position of the control rack from a position sensor 17 and a target position signal Lt showing a target position to which the control rack is to be positioned from a calculation unit 16. The difference between the actual position and the target position of the control rack is calculated in the governor control unit 15 on the basis of the actual position signal Li and the target position signal Lt, and the resulting difference is processed to produce a signal necessary for PID control as a governor control signal Gn therefrom. A driving circuit 14 is responsive to the governor control signal Gn and produces an output signal for controlling the actuator (not shown) of the governor 13.

Figure 2:
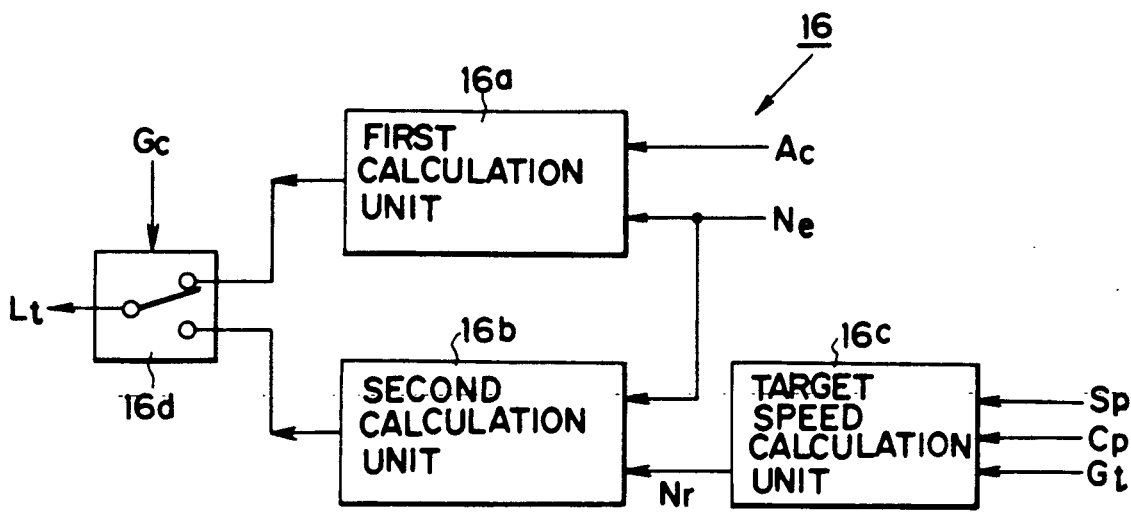
FIG. 2 is a detailed block diagram of the calculation unit of FIG. 1A.

Referring to FIG. 2, the calculation unit 16 comprises a first calculation unit 16a and a second calculation unit 16b. The first calculation unit 16a is responsive to the acceleration signal Ac and the engine speed signal Ne and calculates a first target rack position indicating the position of the control rack at which a fuel quantity suitable for the operation condition at that time can be supplied. The second calculation unit 16b receives the engine speed signal Ne and a target speed signal Nr from a target speed calculation unit 16c. The target speed calculation unit 16c is arranged so as to carry out the calculation for obtaining the target engine speed suitable for the operation condition of the vehicle in response to the vehicle speed signal Sp, a clutch signal Cp indicating the actual clutch stroke of the clutch 2 generated from a clutch position detector 25 shown in FIG. 1 and a target gear signal Gt indicating an target gear position for the gear transmission 3 produced from a determination unit 34 shown in FIG. 1. In the second calculation unit 16b, the operation for PID control based on the difference between the actual engine speed shown by the engine speed signal Ne and the target engine speed shown by the target speed signal Nr is carried out to determine a second target rack position.

The calculation unit 16 is provided with a switch 16d for selecting the output of either the first or second calculation unit 16a or 16b as the target position signal Lt in response to a gear-shifting signal Gc, which is produced by a gear-shifting control unit 33 shown in FIG. 1 and contains information concerning whether or not the gear transmission 3 is in the course of a gear-shifting operation. The signal showing the result produced by the first calculation unit 16a is derived from the switch 16d as the target position signal Lt when the gear-shifting operation of the gear transmission 3 is not being carried out, so that the position of the control rack is positioned so as to obtain a fuel quantity suitable for the amount of operation of the accelerator pedal 6 and the engine speed. The signal showing the result produced by the second calculation unit 16b is derived from the switch 16d as the target position signal Lt when the gear-shifting operation of the gear transmission 3 is being carried out, so that the position of the control rack is controlled in response to the target position signal Lt irrespective of the amount of operation of the accelerator pedal 6, whereby temporary increase in the engine speed can be suppressed during the gear-shifting operations of the gear transmission 3.

A power control unit 90 shown in FIG. 1 serves to produce a power control signal ES for controlling the power ON/OFF operation of the respective control systems of the vehicle.

Figure 3:
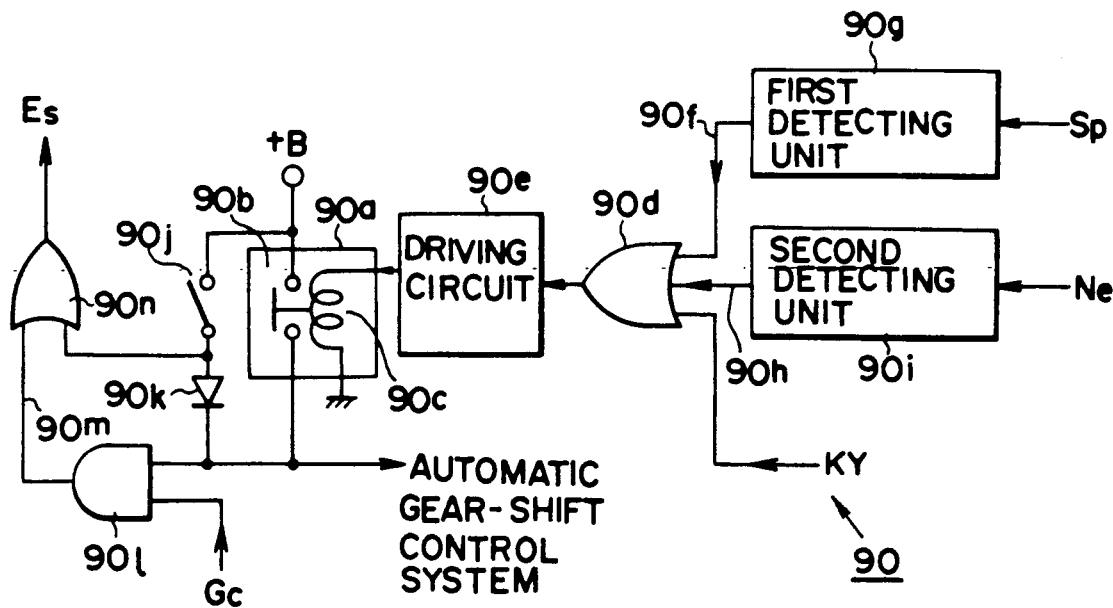
FIG. 3 is a detailed block diagram of the power control unit of FIG. 1A.

As illustrated in more detail in FIG. 3, the power control unit 90 comprises a relay 90a with a relay switch 90b, in which one terminal of the relay switch 90b is connected with a power source +B and the other terminal of the relay switch 90b is connected to the power input terminal (not shown) of the automatic gear-shift control system AM. The relay 90a is further provided with a relay coil 90c associated with the relay switch 90b and the relay coil 90c is driven by a driving circuit 90e responsive to the output signal of an OR circuit 90d. There are provided on the input side of the OR circuit 90d a first detecting unit 90g and a second detecting unit 90i. The first detecting unit 90g is for detecting, in response to the vehicle speed signal Sp, whether or not the vehicle is running, and a high level signal appears on an output line 90f thereof only when the vehicle is running, that is, when the running speed of the vehicle is not zero. On the other hand, the second detecting unit 90i is for detecting, in response to the engine speed signal Ne, whether or not the engine speed is zero, and a high level signal appears on an output line 90h thereof only when the engine speed is not zero. The output lines 90f and 90h are connected with the input terminals of the OR circuit 90d, which further has an input terminal that receives a key-switch signal KY produced from an ignition switch 18. The level of the key-switch signal KY is low only when the ignition switch 18 is turned to its OFF position and is high when the ignition switch 18 is turned to a position other than the OFF position.

Accordingly, the output level of the OR circuit 90d becomes low only when the ignition switch 18 is turned to its OFF position in the case of a zero running speed of the vehicle and a zero engine speed. The driving circuit 90e energizes the relay coil 90c so as to close the relay switch 90b only when the output level of the OR circuit 90d is high. The relay switch 90b is connected in parallel with a series circuit of a diode 90k and a switch 90j which is ganged with the ignition switch 18 so as to be opened when the ignition switch 18 is turned to is its OFF position and be closed when the ignition switch 18 is turned to a position other than the OFF position. The diode 90k serves to supply power from the power source +B to the automatic gear-shift control system AM through the switch 90j even if the relay switch 90b is not closed.

The cathode of the diode 90k is connected to one input terminal of an AND circuit 90l having another input terminal to which the gear-shifting signal Gc indicating that the shifting operation of the gear transmission 3 is being carried out is applied from the gear-shifting control unit 33 shown in FIG. 1. The output line 90m of the AND circuit 90e is connected with one input terminal of an OR circuit 90n having another input terminal to which the voltage signal developed at the connection point between the diode 90k and the switch 90j is applied, and the power control signal ES is produced from the OR circuit 90n.

According to the circuit arrangement shown in FIG. 3, since the switch 90j is closed at the time the ignition switch 18 is turned to its ON position, the level of power control signal Es is always high so long as the ignition switch 18 is in its ON position, and the electric power necessary for the operation of the automatic gear-shift control system AM is supplied thereto. Even if the switch 90j opens when the ignition switch 18 has been turned to its OFF position, the closed condition of the relay switch 90b is maintained until both the engine speed and the vehicle speed become zero, so that the required power is supplied to each portion of the automatic gear-shift control system AM during that period. In this case, the output level of the AND circuit 901 becomes high since the level of the gear-shifting signal Gc becomes high during the gear-shifting operation of the gear transmission 3. As a result, so long as the gear-shifting operation of the gear transmission 3 is being carried out when the electric power required for operating the automatic gear-shift control system AM is supplied through the relay switch 90b thereto, the power supply operation for the fuel control system 10 is maintained by the power control unit 90 even if the ignition switch 18 is turned to its OFF position.

Returning to FIG. 1, the clutch control system 20 comprises an actuator 21 coupled with the clutch 2, a driving circuit 22 associated with the actuator 21, a clutch control unit 23 for generating a clutch control signal CS for controlling the actuator 21, a stroke sensor 24 for detecting the clutch stroke of the clutch 2, and the clutch position detector 25 which is responsive to the output of the stroke sensor 24 and produces the clutch signal Cp.

Figure 4:
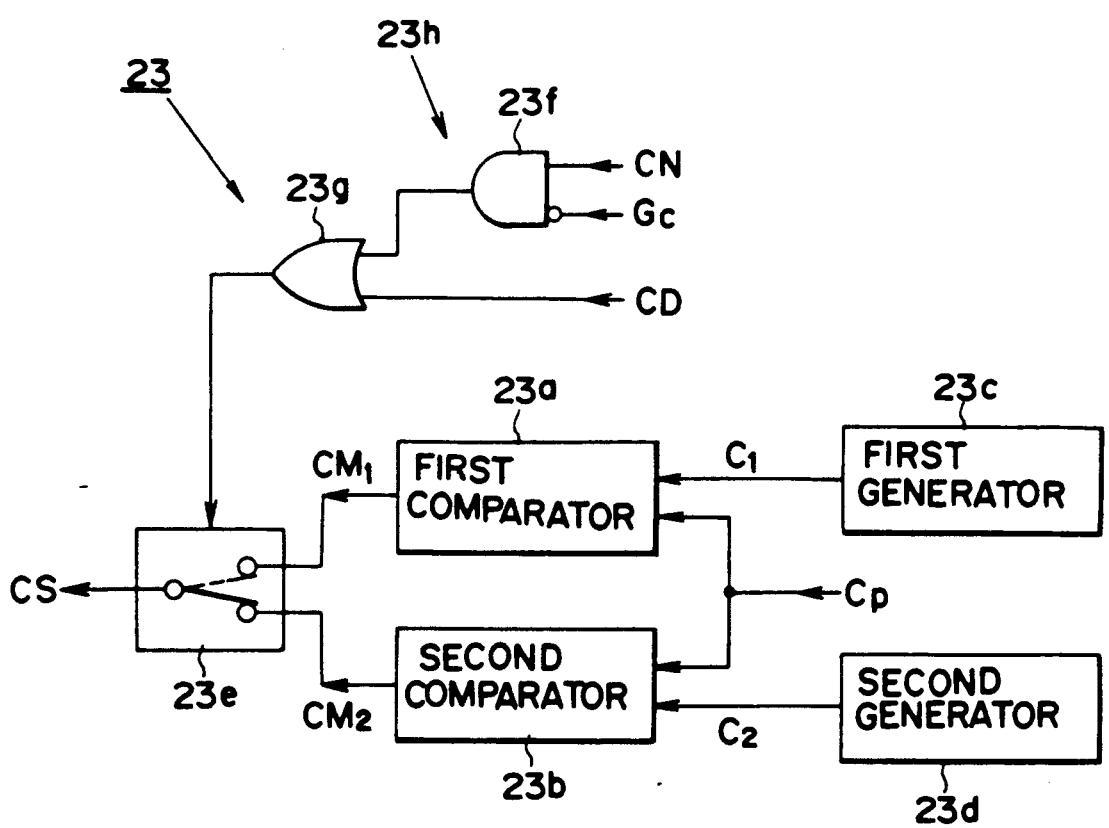
FIG. 4 is a detailed block diagram of the clutch control unit of FIG. 1B.

As illustrated in FIG. 4, the clutch control unit 23 comprises a first comparator 23a and a second comparator 23b. The first comparator 23a is responsive to the clutch signal Cp and a first target signal $C_1$ generated by a first generator 23c to compare the actual clutch stroke indicated by the clutch signal Cp with a first target clutch stroke indicated by the first target signal $C_1$. The first target signal $C_1$ is generated on the basis of first map data stored in the first generator 23c, which shows a time-course pattern of the target clutch stroke for engaging the clutch 2. The first comparator 23a produces a signal $CM_1$ showing the difference between the actual clutch stroke and the target clutch stroke for engaging the clutch 2 at that time. Similarly, the second comparator 23b is responsive to the clutch signal Cp and a second target signal $C_2$ generated by a second generator 23d to compare the actual clutch stroke indicated by the clutch signal Cp with a second target clutch stroke indicated by the second target signal $C_2$. The second target signal $C_2$ is generated on the basis of second map data stored in the second generator 23d, which shows a time-course pattern of the target clutch stroke for disengaging the clutch 2. The second comparator 23b produces a signal $CM_2$ showing the difference between the actual clutch stroke and the target clutch stroke for disengaging the clutch 2 at that time.

The signals $CM_1$ and $CM_2$ are applied to a selecting switch 23e, the operation of which is controlled by the output of a logic circuit 23h composed of an OR circuit 23g and a gate circuit 23f. The gear-shifting signal Gc is applied to an inverting input terminal of the gate circuit 23f having another input terminal to which a control signal CN is applied from the determination unit 34 shown in FIG. 1. The output of the gate circuit 23f is connected with one input terminal of the OR circuit 23g having another input terminal to which an ON/OFF command signal CD is applied from the gear-shifting control unit 33, shown in FIG. 1.

Thus, when the ON/OFF command signal is at a high level, OR circuit 23g becomes high and the selecting switch 23e is switched over as shown by the broken line to supply the signal $CM_1$ as the clutch control signal CS, whereby the clutch 2 is engaged by means of the clutch actuator 21. On the other hand, when the ON/OFF command signal is low level for commanding the clutch 2 to be disengaged, the selecting switch 23e is switched over as shown by the solid line to supply the signal $CM_2$ as the clutch control signal CS so long as the output level of the gate circuit 23f is low, whereby the clutch 2 is disengaged by means of the actuator 21. The operation of the gate circuit 23f will be described later.

Returning to FIG. 1, the transmission control system 30 comprises a transmission actuator 31 coupled with the gear transmission 3, a driving circuit 32 for driving the transmission actuator 31, the gear-shifting control unit 33 for generating a transmission control signal TS for controlling the gear transmission 3, and a gear position detector 35 which produces a gear signal Gp showing the actual gear position of the gear transmission 3. The gear signal Gp is compared in the gear-shifting control unit 33 with the target gear signal Gt produced by the determination unit 34 for determining a target gear position suitable for the operation condition of the vehicle and producing a target gear signal Gt indicating the resulting target gear position. Based on the comparison, the gear-shifting control unit 33 produces the transmission control signal TS for operating the gear transmission 3 to shift the gear transmission 3 to the target gear position. The gear-shifting control unit 33 further produces the ON/OFF command signal CD for commanding the clutch 2 to engage/disengage and the gear-shifting signal Gc indicating that the transmission 3 is in the course of a shifting operation.

Figure 5:
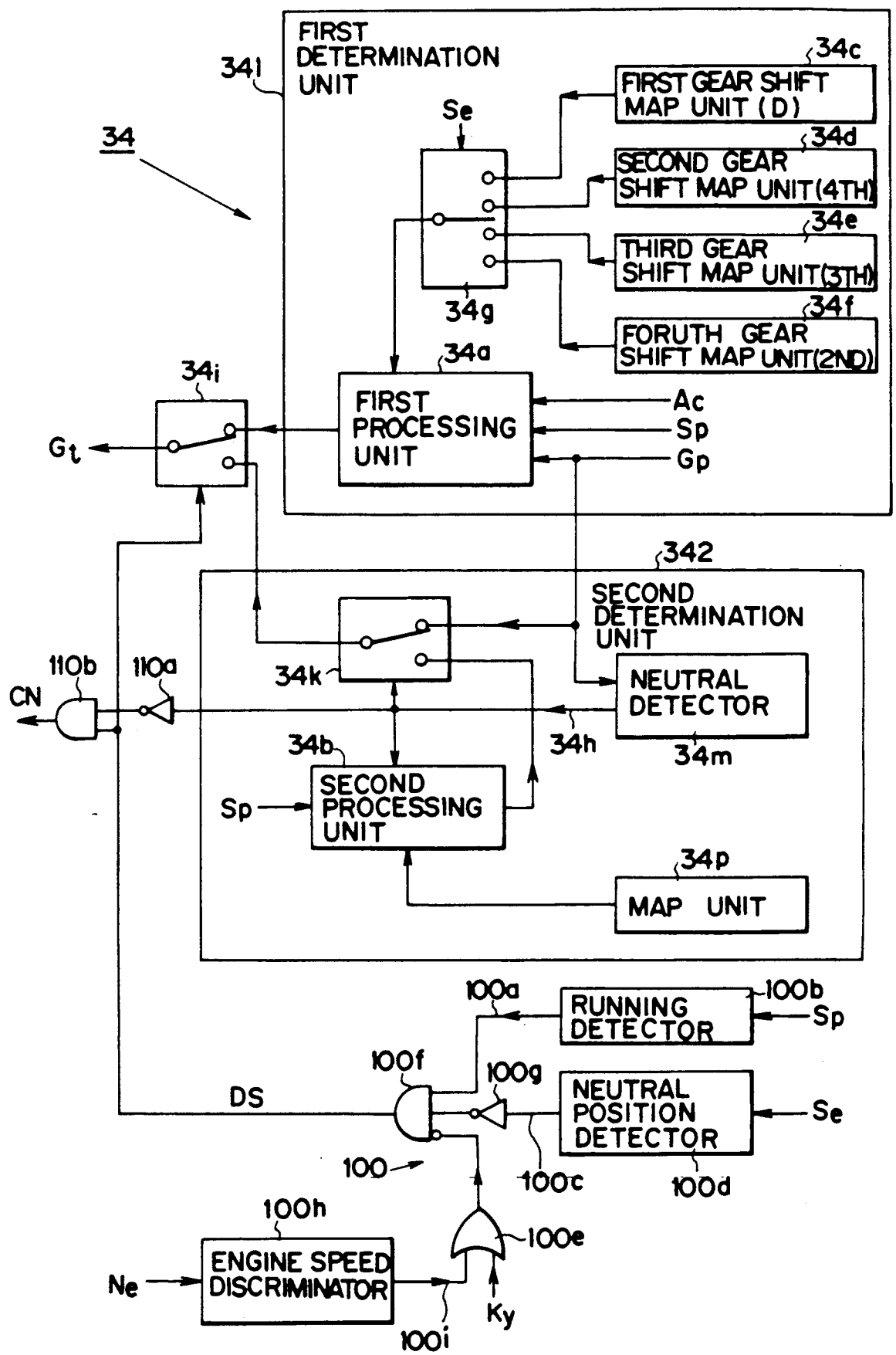
FIG. 5 is a detailed block diagram of the determination unit of FIG. 1B.

Referring to FIG. 5, the determination unit 34 comprises a first determination unit 341 and a second determination unit 342. The first determination unit 341 has a first processing unit 34a receiving the acceleration signal Ac, the vehicle speed signal Sp and the gear signal GP, and first to fourth gear shift map units 34c to 34f connected with a selecting switch 34g controlled by the selector signal Se. In this embodiment, the first map unit 34c is for "D" (drive) position of the selector 7, the second map unit 34d is for 4th position, the third map unit 34e is for 3rd position, and the fourth map unit 34f is for 2nd position. The operation of the selecting switch 34g is controlled by the selector signal Se so as to select the corresponding map unit among the first to fourth gear shift map unit 34c to 34f, and the required gear shift map data is applied through the selecting switch 34g to the first processing unit 34a. Thus, the target gear position suitable for the operation condition of the vehicle is determined by the first processing unit 34a in the conventional manner in accordance with the selected gear-shift map data on the basis of the acceleration signal Ac and the vehicle speed signal Sp. The resulting target gear position obtained by the map calculation is compared with the gear position indicated by the gear signal Gp to determine the target gear position during normal running of the vehicle.

The second determination unit 342 is for determining the target gear position to which the gear transmission 3 is to be shifted when fuel combustion ceases during the running operation of the vehicle. The second determination unit 342 has a switch 34k, a map unit 34p, and a second processing unit 34b and a neutral detector 34m which is responsive to the gear signal Gp to detect whether or not the gear transmission 3 is shifted to its neutral position. A high level output signal appears on the output line 34h of the neutral detector 34m when the transmission 3 is shifted to its neutral position, and the second processing unit 34b is rendered operable to determine a target gear position in accordance with map data supplied from the map unit 34p when the high level output signal appears on the output line 34h.

The output of the second processing unit 34b is applied to one input terminal of the switch 34k having another input terminal to which the gear signal Gp is applied. The switch 34k is controlled in accordance with the level of the output line 34h in such a way that the gear signal Gp is selected when the level of the output line 34b is low and the output from the second processing unit 34b is selected when the level of the output line 34h is high.

The signal selected by the switch 34k is derived as the output signal of the second determination unit 342 therefrom, whereby the target gear position for non-fuel combustion condition during vehicle running is determined by the second determinating unit 342.

The two output signals from the first and second determination units 341 and 342 are applied to a switch 34i whose switching operation is controlled in accordance with a discrimination signal DS produced from a discriminating unit 100.

The discriminating unit 100 is for discriminating whether or not the operating condition of the vehicle is one in which fuel combustion in the diesel engine 1 has creased and the vehicle is running with the gear transmission 3 shifted to its neutral position. The discriminating unit 100 is provided with a running detector 100b for detecting, in response to the vehicle speed signal Sp, whether or not the vehicle is running and a high level state is established on the output line 100a of the running detector 100b when the vehicle is running. A neutral position detector 100d is responsive to the selector signal Se to detect whether or not the selector 7 is in the neutral position, and the level of the output line 100c of the neutral position detector 100d becomes high when the selector 7 is in the neutral position. The output line 100a is directly connected with one input terminal of a gate circuit 100f and the output line 100c is connected through an invertor 100g with another input terminal thereof.

An inverting input terminal of the gate circuit 100f is connected with the output of an OR circuit 100e to one input terminal of which the key-switch signal KY is applied. An engine speed discriminator 100h is responsive to the engine speed signal Ne to detect whether or not the rotational speed of the diesel engine 1 is zero and the level of the output line 100i of the engine speed discriminator 100h becomes high when the engine speed is not zero. The output line 100i is connected with the other input terminal of the OR circuit 100e. Accordingly, the output level of the OR circuit 100e becomes low when the zero engine speed state is discriminated by the engine speed discriminator 100h in the case when the ignition switch 18 is in the OFF state.

Thus, the high level state of the discrimination signal DS is established when the ignition switch 18 is at its OFF position and the engine speed is zero in the case where the vehicle is running with the gear transmission 3 shifted to its neutral position. The level of the discrimination signal DS becomes low in any condition other than the above mentioned condition. Only the key-switch signal KY or the output signal from the engine speed discriminator 100h may be applied to the OR circuit 100e.

The switch 34i is controlled in accordance with the discrimination signal DS so as to select the output of the first determination unit 341 when the level of the discrimination signal DS is low and so as to select the output of the second determination unit 342 when the level of the discrimination signal DS is high. The signal selected by the switch 34i is derived as the target gear signal Gt therefrom.

As will be understood from the above description, since the gear signal Gp is output from the second determination unit 342 when the transmission 3 is shifted to a position other than the neutral position, the gear position does change when the ignition switch 18 is turned to its OFF position in the case where the vehicle is running with the transmission 3 shifted to a gear position other than its neutral position.

On the other hand, when the level of the output line 34b is low because the gear transmission 3 is in neutral position and the output of the second processing unit 34b is thus selected, then in the case where the discrimination signal DS is at a high level, the output from the second processing unit 34b is derived as the target gear signal Gt from the switch 34i. Therefore, even if the vehicle is running with the gear transmission 3 shifted to its neutral position when the ignition switch 18 is turned to the OFF position, the gear transmission is operated so as to be shifted to the gear position suitable for the vehicle speed on the basis of the map data stored on the map unit 34p.

The discrimination signal DS is further supplied to one input terminal of an AND circuit 110b having another input terminal with which the output line 34h is connected through an invertor 110a. Accordingly, the level of the control signal CN output from the AND circuit 110b becomes high only when the level of the discrimination signal DS is high in the case where the gear transmission 3 is shifted to a position other than the neutral position. The control signal CN is supplied to the AND circuit 33f of the clutch control unit 23 shown in FIG. 4.

Referring to FIG. 4, the AND circuit 23f receives the gear-shifting signal Gc at its inverting input terminal, so that the output level of the AND circuit 23f is maintained at a low level so long as the level of the gear-shifting signal Gc is high even if the level of the control signal CN is high, whereby the disengaged state of the clutch 2 is maintained. When the level of the gear-shifting signal Gc becomes low in this case, the output level of the AND circuit 23f changes to a high level so that the selecting switch 23e is operated so as to select the signal $CM_1$, whereby the clutch 2 is engaged.

As described above, when it is discriminated by the discriminating unit 100 that the ignition switch 18 is turned to its OFF position in the case where the vehicle is running with the selector positioned to a position other than the neutral position, the output of the second discrimination unit 342 is selected by the switch 34i to produce the target gear signal and the gear shift operation for shifting the gear transmission 3 to the position determined by the second determination unit 342 is carried out in the transmission control system 30. In this case, the level of the control signal CN becomes high when the gear transmission 3 is shifted to a position other than the neutral gear position, and the clutch control signal CS is produced from the clutch control unit 23 to engage the clutch 2 when the level of the gear-shifting signal Gc has become low.

That is, when the ignition switch 18 is turned to the OFF position to stop the rotation of the diesel engine 1 while the vehicle is running with the gear transmission 3 shifted to a gear position other than the neutral position, the gear transmission 3 is forcibly shifted to a suitable gear position other than the neutral position and the clutch 2 is engaged. As a result, the rotational torque of the axle 4 of the vehicle is transmitted to the diesel engine, so that the diesel engine 1 is made to rotate through the vehicle transmission system. This enables the power steering system PS and the power braking system PB to operate reliably until the vehicle speed becomes less than a prescribed speed.

We claim:

1. A system for controlling a vehicle transmission apparatus for a vehicle powered by an internal combustion engine including e gear transmission electronically controlled by a transmission control unit and a clutch electronically controlled by a clutch control unit, said system comprising:

means for producing a key-switch signal indicating that an ignition switch is in its OFF position;

a discriminating means responsive to the key-switch signal for discriminating whether or not the vehicle is running with the gear transmission shifted to its neutral position and fuel combustion in the engine discontinued;

a first determining means for determining a first target gear position to which the gear transmission is to be shifted when the vehicle is running with the engine powered by the fuel combustion;

a second determining means for determining a second target gear position to which the gear transmission is to be shifted when the vehicle is running without fuel-combustion in the engine;

a providing means for providing an output from either said first or second determining means to the transmission control unit in accordance with a discrimination result obtained by said discriminating means, whereby the transmission control unit is caused to control the gear transmission to shift to the gear position indicated by the output provided by said providing means; and means responsive to said discriminating means for producing a control signal for controlling the clutch control unit to engage the clutch at a prescribed timing.

2. A system as claimed in claim 1, wherein said system further comprises a vehicle speed detecting means for producing a vehicle speed signal indicative of a running speed of the vehicle and an acceleration detecting means for producing an acceleration signal indicative of the amount of operation of an acceleration member associated with the engine, and the first target gear position is determined by said first determining means in response to the vehicle speed signal and the acceleration signal.

3. A system as claimed in claim 2, wherein the first target gear position is determined by a map calculation in accordance with a prescribed set of map data.

4. A system as claimed in claim 3, wherein the prescribed set of map data is selected from among a plurality of sets of map data in accordance with a selected operation position.

5. A system as claimed in claim 2, wherein said second determining means has a map calculating unit responsive to the vehicle speed signal for determining the second target position.

6. A system as claimed in claim 5, wherein said second determining means further comprises a neutral detecting means for detecting whether or not the gear transmission is shifted to its neutral position; and wherein, when the gear transmission is shifted to a position other than the neutral position, data representing a present gear position of the gear transmission is output by said second determining means.

7. A system as claimed in claim 1, wherein said discriminating means comprises a first detecting means for detecting a running condition of the vehicle, a second detecting means for detecting an operation condition of a selector for selecting a gear-shifting mode and a third determining means responsive to the first and second detecting means and the key-switch signal for determining whether or not the operation condition of the vehicle is in a specific condition when the ignition switch is turned to the OFF position and the vehicle is running with the selector positioned to the neutral position.

8. A system as claimed in claim 7, wherein said providing means is controlled by said third determining means for providing the output of said second determining means in the case of the specific condition and the output of said first determining means in the case of a condition other than the specific condition.

9. A system as claimed in claim 1, wherein said system further comprises a power control unit for controlling a supply of electric power from a power source to said system in response to the operation of the ignition switch.

10. A system as claimed in claim 9, wherein said power control unit has a first control means for maintaining the electric power supply to both the transmission control unit and the clutch control unit even if the ignition switch is turned to the OFF position unless the speeds of both the vehicle and the engine are zero.

11. A system as claimed in claim 10, wherein said power control unit further comprises a second control means for supplying the electric power necessary for controlling the operation of the engine when the gear transmission is in the course of a gear-shifting operation and when power is being supplied to the transmission control unit and the clutch control unit by said first control means.

* * * * *